United States Patent [19]
Tomomatsu et al.

[11] Patent Number: 5,219,913
[45] Date of Patent: Jun. 15, 1993

[54] POLYPROPYLENE-BASED RESIN COMPOSITION

[75] Inventors: Ryuzo Tomomatsu; Takumasa Fukuda, both of Ichihara; Minoru Sugawara, Sodegaura, all of Japan

[73] Assignee: Idemitsu Petrochemical Company, Ltd., Tokyo, Japan

[21] Appl. No.: 753,973

[22] Filed: Sep. 3, 1991

[30] Foreign Application Priority Data

Sep. 12, 1990 [JP] Japan ................................. 2-239927
Sep. 19, 1990 [JP] Japan ................................. 2-247243

[51] Int. Cl.$^5$ .................................................. C08K 3/34
[52] U.S. Cl. ...................................... 524/451; 524/505
[58] Field of Search ................................. 524/451, 505

[56] References Cited

U.S. PATENT DOCUMENTS

| | | | |
|---|---|---|---|
| 4,997,720 | 3/1991 | Bourbonais et al. | 428/500 |
| 5,001,182 | 3/1991 | Maruya et al. | 524/427 |
| 5,039,525 | 8/1991 | Tamashima et al. | 524/423 |
| 5,082,889 | 1/1992 | Kuizumi et al. | 524/451 |

Primary Examiner—Paul R. Michl
Assistant Examiner—John J. Guarriello
Attorney, Agent, or Firm—Wyatt, Gerber, Burke and Badie

[57] ABSTRACT

The polypropylene-based resin composition of the invention consists basically of (a) a polypropylene resin or a block copolymer of propylene and ethylene of specified ethylene content specified in terms of the melt index and the isotacticity relative to the isotactic pentad of the propylene moiety and (b) a talc powder specified in terms of the average particle diameter and the average aspect ratio of particles. The resin composition has good blow-moldability and is capable of giving molded articles having excellent mechanical strengths and dimensional accuracy to be useful, for example, as a material of automobile bumper beams. The performance of the resin composition can be further improved when the composition is a ternary composition by partially replacing the component (a) with (a') a high-density polyethylene specified in terms of the melt index and a special parameter derived from the viscosity measurement or when the composition is a quaternary composition consisting of the components (a), (a') and (b) and an additional component (c) which is a rubbery elastomer, e.g., EPR, specified in terms of the complex viscosity.

2 Claims, 5 Drawing Sheets

POLYPROPYLENE-BASED RESIN COMPOSITION

BACKGROUND OF THE INVENTION

The present invention relates to a novel resin composition based on a polypropylene. More particularly, the invention relates to a novel resin composition based on a polypropylene which is excellent in respect of the adaptability to blow molding such as draw-down resistance, pinch-off characteristic, deep-drawability and the like and capable of giving molded articles having excellent mechanical properties to satisfy the requirements, for example, for bumper beams of automobiles and has an additional advantage that the resin composition is suitable for reclaiming wastes of once molded articles to ensure outstandingly low costs.

As is known, automobile bumper beams are traditionally shaped of a metallic material but, ;n recent years, metal-made bumpers are being rapidly replaced with plastic resin-made ones to comply with the requirements for lighter weight, higher rust-proofness and better moldability. Various resin compositions have been proposed and are under practical use in the prior art as a material of automobile bumper beams including those based on, for example, a high-density polyethylene, polypropylene, Xenoy resin which is a polymer blend of poly(butylene terephthalate) and polycarbonate manufactured and supplied by General Electric Co., talc-containing polypropylene-based composite material, polypropylene-impregnated glass fiber mat in the form of a stampable sheet, SMC resin and so on.

Each of these resins or resin compositions in the prior art has its own advantages and disadvantages in view of the requirements in recent years for upgraded properties of automobile bumper beams to meet the very strict standard in the United States for automobile bumper beams including the so-called 5-miles/hour pendulum test if not to mention the costs. For example, bumper beams shaped by molding a high-density polyethylene or polypropylene are defective due to the poor mechanical strengths although they are advantageous in respect of the low costs. The automobile bumpers prepared by blow-molding of the Xenoy resin are somewhat too expensive due to the material cost and not suitable for reclaiming wastes of once molded bodies. The talc-containing polypropylene-based composite material, which is suitable for blow molding, can only give bumper beams having poor impact strength at low temperatures. The total cost of bumper beams is unavoidably high when they are shaped from the polypropylene-impregnated stampable sheet or from the SMC resin.

SUMMARY OF THE INVENTION

The present invention accordingly has an object to provide a novel low-cost resin composition which is free from the above described problems and disadvantages in the prior art molding materials for use as a material of, for example, automobile bumper beams.

Thus, the composition of the present invention is a polypropylene-based resin composition which, in one aspect, comprises, as a blend:

(a) from 70 to 99 parts by weight of a homopolymeric polypropylene or a copolymer of from 85% to 98.5% by weight of propylene and from 15% to 1.5% by weight of ethylene, of which the melt index does not exceed 1.0 g/10 minutes and the fraction of the isotactic pentad in the homopolymeric sequences of the propylene moiety is at least 93%; and (b) from 30 to 1 part by weight of a powder of talc of which the average diameter of the particles does not exceed 5 μm and the average aspect ratio of the particles is in the range from 3 to 20.

In the above described formulation of the composition, a part of the component (a) can be replaced with a limited amount of (a') a high-density polyethylene having a melt index not exceeding 0.1 g/10 minutes, of which the parameter A defined by the equation $$A = Z_{50}/Z_{10},$$

in which $Z_{10}$ and $Z_{50}$ are the constant strain-rate elongation viscosity at a rate of strain of 0.05 second$^{-1}$ at the moments of 10 seconds and 50 seconds, respectively, has a value in the range from 2 to 20 at 150° C.

In another aspect of the invention, the polypropylene-based resin composition comprises, as a blend:

(a) from 55 to 93 parts by weight of a homopolymeric polypropylene or a copolymer of from 85% to 98.5% by weight of propylene and from 15% to 1.5% by weight of ethylene, of which the melt index does not exceed 1.0 g/10 minutes and the fraction of the isotactic pentad in the homopolymeric sequences of the propylene moiety is at least 93%;

(b) from 5 to 30 parts by weight of a powder of talc of which the average diameter of the particles does not exceed 5 μm and the average aspect ratio of the particles is in the range from 3 to 20; and (c) from 2 to 15 parts by weight of a rubbery elastomer of which the complex viscosity is in the range from $3 \times 10^4$ to $1 \times 10^6$ poise at a frequency of 0.01 Rad/second.

The component (a) in this second aspect of the invention can also be partially replaced with a limited amount of the specific high-density polyethylene defined as the component (a') in the first aspect of the invention.

BRIEF DESCRIPTION OF THE DRAWING

FIG. 6c is a cross sectional view of the same as cut and viewed in the direction indicated by the arrows VIc—VIc in FIG. 6a.

DETAILED DESCRIPTION OF THE PREFERRED EMBODIMENTS

Figure 1:
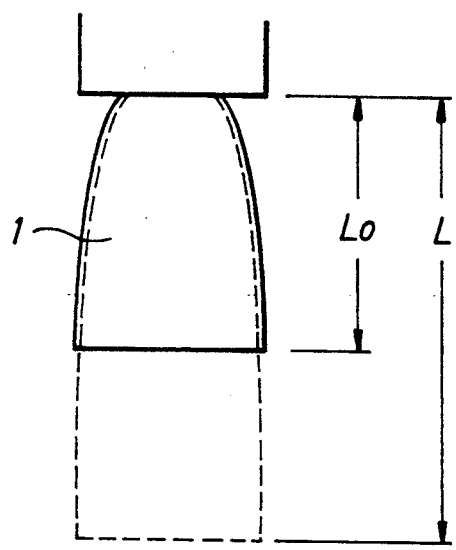
FIG. 1 is for illustration of the method for obtaining the draw-down characteristic of the resin composition.

As is described above, the essential constituents in the inventive polypropylene-based resin composition basically include (a) a homopolymeric polypropylene or an ethylene-propylene copolymer of a specified ethylene content having a specified melt index, of which the isotacticity of the polypropylene segments is defined ;n terms of the fraction of the isotactic pentad and (b) a talc powder specified in terms of the average particle diameter and average aspect ratio of the particles.

In the first aspect of the preferred embodiments, the resin composition consists of from 70 to 99 parts by weight of the above mentioned component (a) and from 30 to 1 part by weight of the above mentioned component (b). The component (a) can be a homopolymeric polypropylene or a block copolymer of ethylene and propylene of which the content of ethylene moiety is in the range from 1.5% to 15% by weight. These polypropylene-based polymers should have a melt index not exceeding 1.0 g/10 minutes or, preferably, not exceeding 0.8 g/10 minutes or, more preferably, not exceeding 0.6 g/10 minutes. When the melt index of the polymer is too large, the resin composition would be poor in respect of the moldability by blow molding such as the draw down resistance and deep-drawability. Further, these polymers should have such isotacticity that the fraction of the isotactic pentad in the homopolymeric segments of the propylene moiety should be at least 93% or, preferably, at least 95% or, more preferably, at least 97%. When the fraction of the isotactic pentad is too small, the molded articles of the resin composition is poor in respect of the rigidity and would show an unduly large deformation in the pendulum test of the bumper beams.

The fraction of the isotactic pentad implied here is the fraction of the isotactic pentad sequences of the propylene moiety ;n the homopolymeric propylene segments and can be determined by the $^{13}$C-NMR spectroscopy according to the method disclosed by A. Zambell; et al. in Macromolecules, volume 6, page 925 (1973). Namely, the fraction gives the percentage of the propylene segments of which continuous five of the propylene monomer units are bonded together by forming meso linkages. The assignment of the $^{13}$C-NMR peaks :n the above mentioned NMR spectroscopy is performed by making reference to the erratum of the above mentioned journal article appearing in volume 8, Page 687 (1975) of the same journal. In practice, the fraction of the isotactic pentad can be given by the intensity fraction of the mmmm peak relative to the overall absorption peaks in the methyl-carbon region in the $^{13}$C-NMR spectrum. incidentally, the above mentioned preferable values of the fraction of the isotactic pentad refer to the crystalline polymer as such without any further treatment such as extraction, fractionation and the like.

When the component (a) is a copolymer of ethylene and propylene, the content of the ethylene moiety therein should be in the range from 1.5% to 15% by weight or, preferably, from 2% to 10% by weight or, more preferably, from 4% to 8% by weight. When the content of the ethylene moiety is too large, a decrease is caused in the rigidity of the molded articles obtained from the resin composition and the deformation of the bumper beams prepared from the resin composition would be too large in the pendulum test. When the content of the ethylene moiety is too small, on the other hand, desirable good balance could not be obtained between the impact strength and the rigidity of the articles molded from the resin composition. It is optional that the component (a) is a combination of a homopolymeric polypropylene and an ethylene-propylene copolymer according to the above given definition.

The component (b) in the inventive resin composition is a talc powder which serves as a filler. Specifically, the average particle diameter of the talc powder should not exceed 5 $\mu$m or, preferably, 2 $\mu$m. Further, the particles of the talc powder should have an average aspect ratio in the range from 3 to 20 or, preferably, from 7 to 20 or, more preferably, from 10 to 20. When the average particle diameter of the talc powder is too large, the resin composition would be poor in the deep-drawability and pinch off strength and the articles molded from the resin composition would have somewhat decreased rigidity and impact strength, when the average aspect ratio of the talc particles is too small, the articles molded from the resin composition is poor in the rigidity and would show an increased deformation in the pendulum test.

The polypropylene-based resin composition of the invention according to the first aspect consists of from 70 to 99 parts by weight of the component (a) and from 30 to 1 part by weight of the component (b) or, preferably, from 75 to 95 parts by weight of the component (a) and from 25 to 5 parts by weight of the component (b) or, more preferably, from 80 to 90 parts by weight of the component (a) and from 20 to 10 parts by weight of the component (b). When the amount of the component (b) is too small, the articles molded from the resin composition would be poor in respect of the rigidity and dimensional accuracy and would exhibit an unduly increased deformation in the pendulum test. An excessively large amount of the component (b) would result in poor pinch-off strength and deep-drawability of the resin composition and a decrease in the impact strength of the articles molded therefrom.

It is optional when further improvement is desired :n the draw-down characteristics and deep-drawability of the resin composition and impact strength of the articles molded therefrom that a part of the above defined component (a) is replaced with (a') a specific high-density polyethylene which should have a melt index not exceeding 0.1 g/10 minutes or, preferably, not exceeding 0.07 g/10 minutes or, more preferably, not exceeding 0.04 g/10 minutes. Further, the high-density polyethylene should have a value of the above defined parameter A in the range from 2 to 20 or, preferably, from 3 to 10 or, more preferably, from 4 to 8 at 50° C. When the melt index of the high-density polyethylene as the component (a') is too large, some decrease would be caused in the moldability of the resin composition such as the draw-down resistance and deep-drawability. When the value of the parameter A is too small, some decrease would be caused in the moldability of the resin composition such as the draw-down resistance and deep-drawability while, when the value of the parameter A is too large, the resin composition would be somewhat poor in the adaptability to extrusion molding.

The amount of the component (a'), if used, to replace the component (a) ;s limited in such a way that the amount thereof does not exceed 30% by weight of the resin composition consisting of the components (a), (b) and (a'). Namely, the polypropylene-based resin composition consists of, as a blend:

(a,a') from 70 to 99 parts by weight of a combination of the components (a) and (a'); and from 30 to 1 part by weight of the component (b), the total amount of the components (a), (a') and (b) being 100 parts by weight and the amount of the component (a') being 30 parts by weight or smaller. When the amount of the component (a') is too large, adverse influences are caused on the pinch-off strength, high temperature rigidity and dimensional accuracy of the articles molded from the resin composition.

In the second aspect of the preferred embodiments of the invention, the resin composition further comprises, in addition to the above described components (a) and (b) or components (a), (a') and (b), a specified rubbery elastomer as the component (c), which should have a complex viscosity in the range from $3 \times 10^4$ to $1 \times 10^6$ poise or, preferably, from $6 \times 10^4$ to $7 \times 10^5$ poise or, more preferably, from $9 \times 10^4$ to $4 \times 10^5$ poise at a frequency of 0.01 Rad/second. Rubbery elastomers satisfying this requirement can be obtained from the group consisting of EPR, EPDM, EBM, SEBS, MBS. SBS and the like, of which EPR is preferred. The component (c) is effective to further improve the draw-down resistance and deep-drawability of the resin composition and the low-temperature impact strength of the articles molded therefrom. When the complex viscosity of the rubbery elastomer is too small, no improvement in these properties can be obtained. When the complex viscosity of the rubbery elastomer is too large, difficulties are caused in uniformly dispersing the rubbery elastomer in the resin matrix not to give the full effect of consistency increase resulting in insufficient achievement of the desired improvements.

When the polypropylene-based resin composition of the invention consists of the components (a), (b) and (c), the composition comprises, as a blend:

from 55 to 93 parts by weight of the component (a);
from 5 to 30 parts by weight of the component (b); and
from 2 to 15 parts by weight of the component (c), the total amount of the components (a), (b) and (c) being 100 parts by weight.

Preferably, the resin composition comprises, as a blend:

from 63 to 90 parts by weight of the component (a);
from 5 to 25 parts by weight of the component (b); and
from 2 to 12 parts by weight of the component (c). the total amount of the components (a), (b) and (c) being 100 parts by weight.

More preferably, the resin composition comprises, as a blend:

from 72 to 85 parts by weight of the component (a);
from 5 to 20 parts by weight of the component (b); and
from 2 to 8 parts by weight of the component (c), the total amount of the components (a), (b) and (c) being 100 parts by weight.

When the amount of the component (c) is too small, no full improvement can be obtained in the low-temperature impact strength of the articles molded from the resin composition. When the amount thereof is too large, on the other hand, a decrease is caused in the Pinch-off strength of the molded articles and an increase is caused in the deformation of the articles, e.g., bumper beams, molded therefrom in the pendulum test.

In a likewise way as in the first aspect of the invention, the component (a) can be partly replaced with a high-density polyethylene as the component (a') defined before. The amount of the component (a') to replace the component (a), when added, is limited in such a way that the amount thereof does not exceed 30% by weight of the resin composition consisting of the components (a), (b), (c) and (a'). Namely, the polypropylene-based resin composition in this embodiment of the invention comprises, as a blend: from 55 to 93 parts by weight of a combination of the components (a) and (a');

from 5 to 30 parts by weight of the component (b), and from 2 to 15 parts by weight of the component (c), the total amount of the components (a), (a'), (b) and (c) being 100 parts by weight and the amount of the component (a') being 30 parts by weight or smaller.

It is optional according to need that the above described polypropylene-based resin composition of the invention is admixed with various kinds of known additives conventionally used in plastic resin-based molding compositions. Examples of the optional additives include thermoplastic resins other than the above described essential ingredients, such as polyolefins modified with maleic anhydride or acrylic acid, and inorganic fillers other than talc, such as calcium carbonate, mica and glass fibers, as well as other additives such as antioxidants, ultraviolet absorbers, heat stabilizers, lubricants, flame retardants, coloring agents and the like each added in a limited amount.

The polypropylene-based resin composition of the present invention can be prepared by uniformly blending and kneading, in a molten state, using a suitable resin-blending machine such as single-screw kneaders, double-screw kneaders, multiscrew kneaders, Banbury mixers and the like, the components (a) and (b), the components (a), (a') and (b), the components (a), (b) and (c) or the components (a), (a'), (b) and (c) together with other optional additives. Although the conditions in the preparation of the composition are not particularly limitative, it is advantageous that, when the blending machine is not of the type of the Banbury mixers to cause a remarkable heat evolution by the shearing force added to the composition under blending as a consequence of the high melt viscosity of the polymeric components resulting in degradation of the polymers and hence a decrease in the draw-down resistance of the composition, the temperature of the melt under blending is controlled not to exceed 250° C. at the highest by setting the operating temperature in the range from 190° to 230° C. and keeping the pressure on the resin blend in the cylinder as low as possible.

The polypropylene-based resin composition prepared in the above described manner is suitable for preparing various kinds of molded articles by a suitable known molding method. For example, the resin composition is useful as a material for blow molding to prepare automobile bumper beams having excellent properties such as high mechanical properties, light weight and dimensional accuracy. In particular, the resin composition reclaimed from wastes of once molded articles has good properties almost equivalent to fresh resin compositions so as to contribute to a decrease in the costs of molded articles.

In the following, examples and comparative examples are given to more fully illustrate the polypropylene-based resin composition of the invention although the scope of the invention is never limited by these examples in any way.

Following tables give characterization of the various constituents from which the resin compositions were prepared in the examples and comparative examples.

i) Polypropylene resins as the component (a)

TABLE 1

| Polymer | MI | Ethylene content, % | Fraction of isotactic pentad, % |
|---|---|---|---|
| BPP-I | 0.6 | 3.0 | 95 |
| BPP-II | 1.3 | 5.0 | 96 |
| BPP-III | 0.6 | 5.0 | 98 |
| BPP-IV | 0.3 | 3.0 | 96 |
| BpP-V | 0.3 | 5.0 | 97 |
| BPP-VI | 1.3 | 5.0 | 95 |
| BPP-VII | 0.6 | 17.0 | 97 |
| BPP-VIII | 0.6 | 5.0 | 92 |
| BPP-IX | 0.3 | 17.0 | 96 |
| BPP-X | 0.3 | 3.0 | 91 |
| BPP-XI | 0.3 | 8.0 | 98 |
| BPP-XII | 0.6 | 4 | 96 |
| BPP-XIII | 0.6 | 4 | 98 |
| BPP-XIV | 0.6 | 8 | 96 |
| BPP-XV | 0.4 | 4 | 96 |
| BPP-XVI | 0.4 | 8 | 96 |
| BPP-XVII | 0.4 | 4 | 90 |
| BPP-XVIII | 0.4 | 17 | 96 |
| BPP-XIX | 0.4 | 1.2 | 96 |
| HPP-I | 0.5 | 0 | 95 |
| HPP-II | 0.5 | 0 | 96 |

BPP: block copolymer of propylene and ethylene
HPP: homopolymeric polypropylene
MI: Melt index, g/10 minutes ii) High-density polyethylenes as the component (a')

TABLE 2

| Polymer | MI | A |
|---|---|---|
| HDPE-I | 0.03 | 6 |
| HDPE-II | 0.07 | 7 |
| HDPE-III | 0.07 | 1.5 |
| HDPE-IV | 0.12 | 6 |
| HDPE-V | 0.07 | 22 |
| HDPE-VI | 0.07 | 1.5 |

MI: melt index, g/10 minutes
A: $A = Z_{50}/Z_{10}$ (see text for $Z_{50}$ and $Z_{10}$)

iii) Talc powders as the component (b)

TABLE 3

| Talc | Average particle diameter, μm | Average aspect ratio |
|---|---|---|
| T-I | 1.5 | 15 |
| T-II | 15 | 5 |
| T-III | 1.5 | 2 |
| T-IV | 1.5 | 14 |
| T-V | 1.5 | 18 |
| T-VI | 3 | 23 |
| T-VII | 1.0 | 2 | iv) Rubbery elastomer EPR as the component (c)

TABLE 4

| Polymer | Complex viscosity, poise $\gamma^*$ |
|---|---|
| EPR-I | $2 \times 10^5$ |
| EPR-II | $3 \times 10^5$ |
| EPR-III | $2 \times 10^4$ |
| EPR-IV | $1.5 \times 10^6$ |

$\gamma^*$) at a frequency of 0.01 Rad/second

The resin compositions prepared in the examples and comparative examples were evaluated for the items shown below by the respective testing procedures given there.

General properties

Item A; density in g/cm$^3$
Item B: flexural elastic modulus in kg/cm$^2$
Blow-molding characteristics Blow molding of the resin composition was performed by using a die having a die diameter of 37 mm and a core diameter of 33 mm under the operating conditions including the temperature of the cylinder of 230° C., temperature of the metal mold of 40° C. and weight of parison of 340 g.

Item C: draw-down resistance

The draw-down ratio is the ratio of the length of the parison immediately after injection, i.e. 40 cm, at a resin temperature of 230±5° C. to the length of the parison 15 seconds thereafter (see FIG. 1). The acceptable value of this ratio is 0.90 or smaller.

Item D: pinch-off strength

Figure 2:
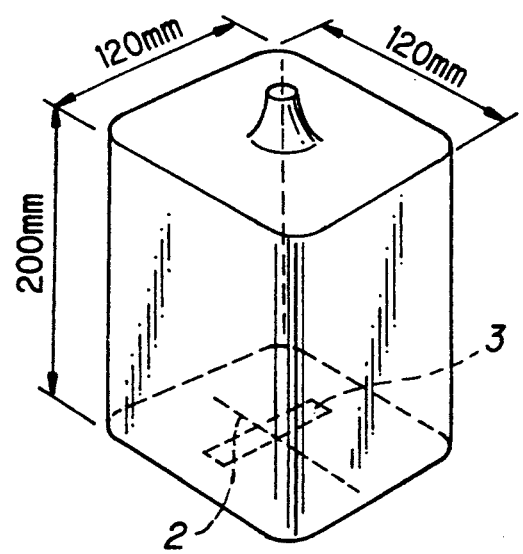
FIG. 2 is a perspective view of a square bottle for the determination of the pinch-off strength showing the position at which the bottle is worked to make a concave groove.
Figure 3:
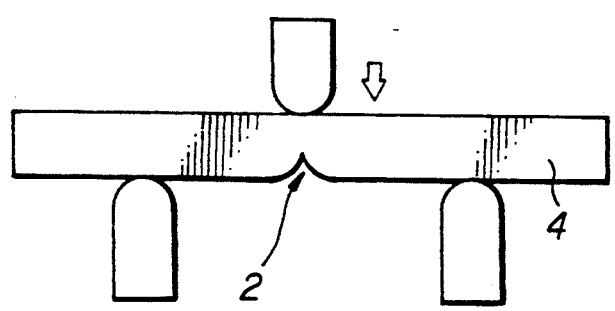
FIG. 3 is an illustrative figure for the three-point bending test to determine the pinch-off strength.
Figure 4:
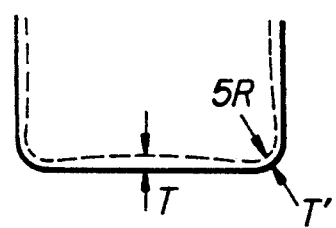
FIG. 4 is an illustration of the square bottle used in the test of deep-drawability showing the thick-walled portions in the bottom center and in the bottom corner.

The resin composition was blow-molded into a square bottle of 120 mm by 120 mm wide and 200 mm high, from which a test specimen of 8 cm long and 2 cm wide was taken from the bottom by cutting in such a fashion that the test specimen included the pinch-off portion at the center thereof (see FIG. 2). The test specimen was subjected to a 3-point bending test as illustrated in FIG. 3 by using an automatic material-testing machine operated under the conditions of: 5 mm/minute of the velocity of the pushing head at the center; 40 mm of the span for supporting; and 10 to 50 kg of the scale range. The pinch-off strength in kg/cm was calculated as a ratio of the maximum load in bending in kg and the thickness of the test specimen in cm. The acceptable value of the pinch-off strength is 15 kg/cm or larger.

Item E: deep-drawability

The square bottle prepared in the above described pinch-off strength test was subjected to the measurement of the wall thickness at the bottom corner (5R) and the wall thickness at the bottom center and the deep-drawability was given in % as the ratio of the wall thickness at the bottom corner to the wall thickness at the bottom center. The acceptable value of the deep-drawability is 50% or larger.

Pendulum test of bumper beams

Figure 6A:
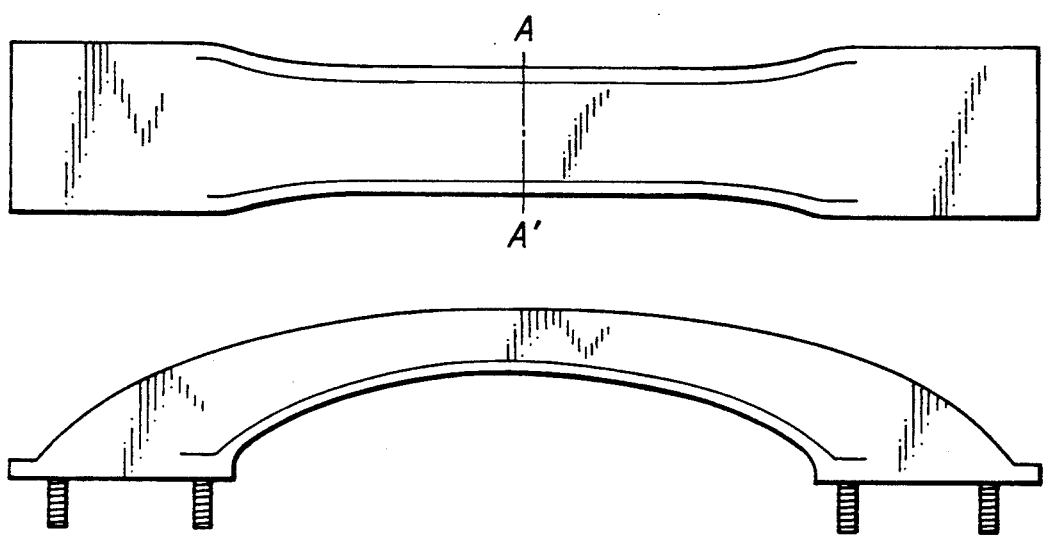
FIGS. 6a and 6b are each a front view and a plan view, respectively, of an automobile bumper beam
Figure 6B:
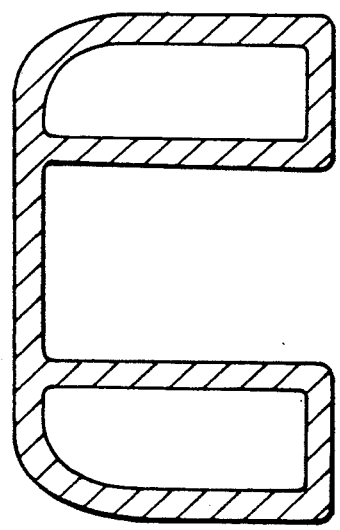

Automobile bumper beams of 6 to 8 kg weight having a length of 1600 mm were prepared by blow-molding the resin composition by using a 2000 mm long metal mold under the conditions shown below. The weight of the mold flash was 9 to 12 kg and the length of parison was 2100 mm. The bumper beam is illustrated in FIGS. 6a, 6b and 6c by a front view, plan view and cross sectional view, respectively.

Molding conditions
  Molding machine: 90 mm diameter blow-molding machine
  Screw diameter: 90 mm
  Diameter of die: 300 mm
  Accumulator: 25 liters
  Clamping pressure: 60 tons
  Screw revolution: 40 rpm
  Load on motor: 115 A
Temperature conditions
  Cylinder No. 1: 230° C.
  Cylinder No. 2: 210° C.
  Cylinder No. 3: 100° C.
  Cylinder No. 4: 190° C.
  Crosshead No. 1: 190° C.
  Crosshead No. 2: 190° C.
  Crosshead No. 3: 190° C.
  Die No. 1: 190° C.

Figure 5A:
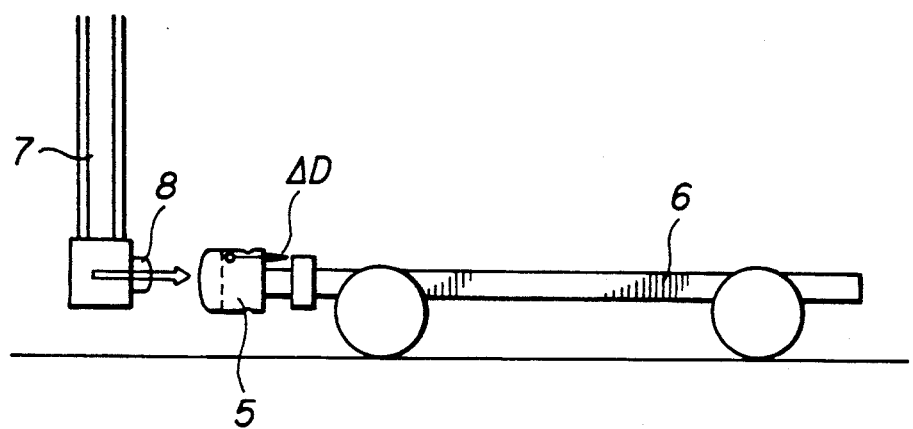
FIGS. 5a and 5b are each a schematic illustration of the side view and plan view, respectively, of an automobile body equipped with the bumper beam under the pendulum test.
Figure 5B:
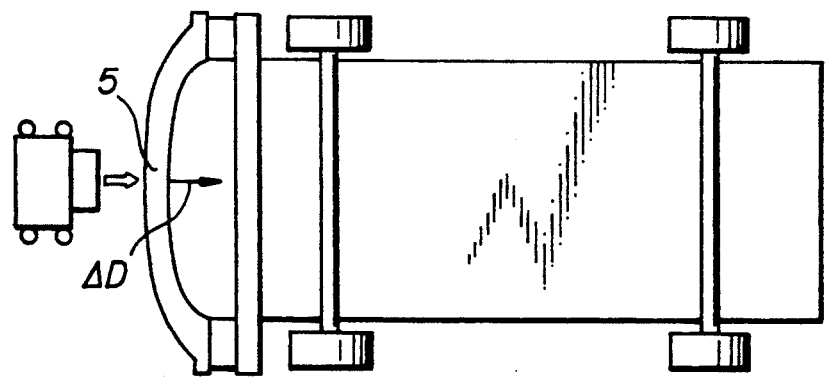

Die No. 2: 190° C.
Metal mold 28° C.
Resin composition: 225° C.
Molding cycle: 330 seconds The bumper beam prepared in this manner was mounted on a car body of 1400 kg weight as is illustrated in FIGS. 5a and 5b and subjected to the pendulum test to give the maximum deformation in mm. The state of broken bumper beam was visually inspected. The conditions of the pendulum impact were as follows.

Figure 7:
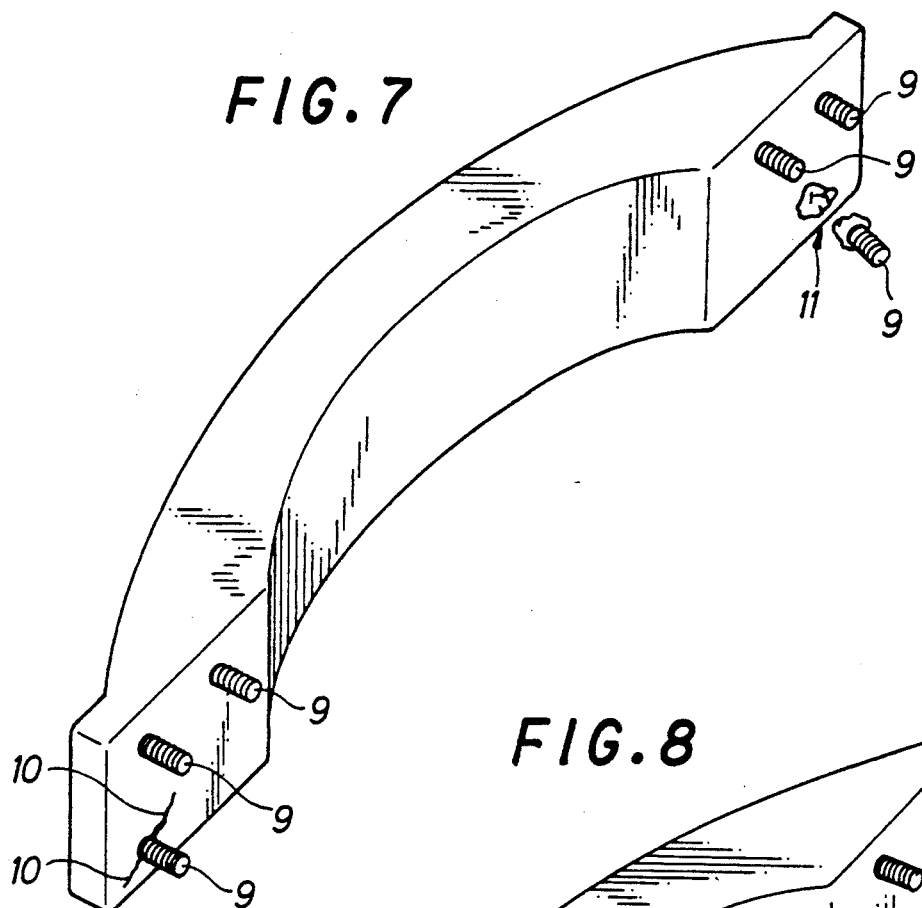
FIG. 7 is a perspective view of an automobile bumper beam after the pendulum test showing the portions in the material broken by the test to form cracks.

Velocity of impact: 5.0 miles/hour
Weight of car body: 1400 kg
Position of impact: center of bumper beam
Temperature: −30° C.
Weight of bumper beam: 7 kg
Weight of pendulum: 1400 kg
Item F: cracks at insert bolts Occurrence of cracks in the bumper beam after pendulum impact was visually inspected at the base portion of the insert bolts as is illustrated in FIG. 7. The results were recorded as Yes and No for occurrence and absence, respectively, of cracks.

Item G: damages at pinch-off

Figure 8:
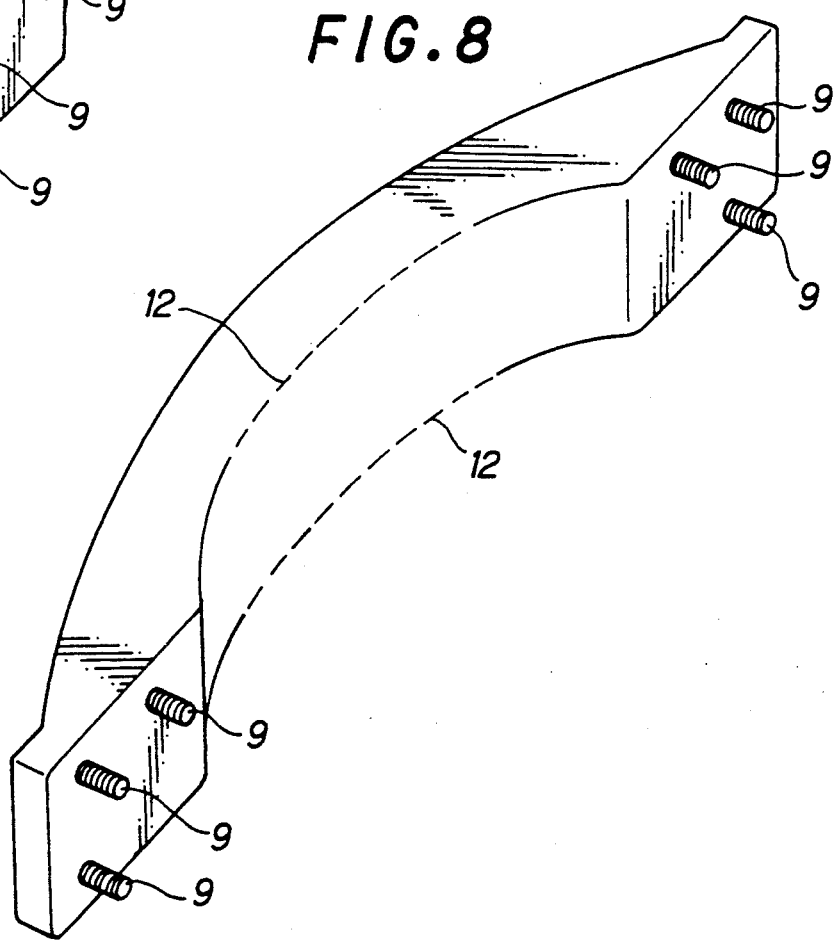
FIG. 8 is a perspective view of an automobile bumper beam after the pendulum test showing the pinch-off portion damaged by the test.

Damages caused in the pinch off portion of the bumper beam, as is illustrated in FIG. 8, was visually inspected after pendulum impact. The results were recorded as Yes and No for occurrence and absence, respectively, of damages.

Item H: maximum deformation

The deformation given by 1D in FIG. 5b was measured in mm as the maximum deformation of the bumper beam by the pendulum impact. The acceptable value of the maximum deformation is 60 mm or smaller.

Examples 1 to 25 and Comparative Examples 1 to 23

In each of these examples and comparative examples, one of the polypropylene resins BPP-I to -XIX, optionally, in combination with HPP-I or -II, one of the talc powders T-I to -VII, one of the high-density polyethylenes HDPE-1 to -VI, if any, and one of the rubbery elastomers EPR-1 to -IV, if any, as indicated in Table 5 were taken in a weight proportion also indicated in the same table and they were blended and kneaded together in a kneader at about 230° C. followed by pelletization into pellets of the respective resin compositions.

The pellets of the thus prepared resin compositions were subjected to the evaluation tests for the general properties, blow-molding characteristics and pendulum test of the bumper beams shaped therefrom. The results are summarized in Table 5.

In Examples 7 and 22, the block-copolymeric polypropylene was used in combination with a homopolymeric polypropylene in a weight proportion indicated in Table 5. The ethylene content, the overall melt index and overall weight fraction of the isotactic pentad were: 2.5% by weight, 0.7 g/10 minutes and 96%, respectively, for the combination in Example 7; and 4.3% by weight, 0.6 g/10 minutes and 96%, respectively, for the combination in Example 22.

In Examples 11 and 24, the formulations of the components were the same as in Examples 4 and 14, respectively, but the pellets used in these examples were reclaimed from and prepared by crushing the mold flash occurred in the blow molding of the bumper beams in Examples 4 and 14, respectively, by using a crusher. The amount of the mold flash was about 60% by weight of the parison.

Reference Examples 1 and 2

With an object to make a comparison with commercially available resin compositions and the inventive resin compositions, Xenoy 1402B resin (polymer blend of a polybutylene terephthalate and polycarbonate, a product by General Electric Co.) was subjected in Reference Example 1 to the evaluation tests as in the preceding examples. Further, Reference Example 2 was undertaken by using reclaimed pellets from the mold flash in Reference Example 1 in the same manner as in Examples 11 and 24.

TABLE 5

| | | (a) | | (a') | | (b) | | (c) | |
|---|---|---|---|---|---|---|---|---|---|
| Example | 1 | BPP-IV | (90) | | | T-I | (10) | | |
| | 2 | BPP-V | (90) | | | T-I | (10) | | |
| | 3 | BPP-XI | (90) | | | T-I | (10) | | |
| | 4 | BPP I | (80) | HDPE I | (10) | T-I | (10) | | |
| | 5 | BPP-I | (60) | HDPE-I | (20) | T-I | (20) | | |
| | 6 | BPP-I | (70) | HDPE-I | (10) | T-I | (20) | | |
| | 7 | BPP-II HPP-I | (40) (40) | HDPE-I | (10) | T-I | (10) | | |
| | 8 | BPP-III | (70) | HDPE-I | (10) | T-I | (20) | | |
| | 9 | BPP-I | (85) | HDPE-I | (5) | T-I | (10) | | |
| | 10 | BPP-IV | (85) | HDPE-II | (5) | T-I | (10) | | |
| | 11 | BPP-I | (80) | HDPE-I | (10) | T-I | (10) | | |
| | 12 | BPP-XV | (75) | | | T-IV | (15) | EPR-I | (10) |
| | 13 | BPP-XVI | (80) | | | T-IV | (15) | EPR-I | (5) |
| | 14 | BPP-XII | (70) | HDPE-I | (70) | T-IV | (15) | EPR-I | (5) |
| | 15 | BPP-XII | (75) | HDPE-I | (5) | T-IV | (15) | EPR-I | (5) |
| | 16 | BPP-XII | (65) | HDPE-1 | (5) | T-IV | (20) | EPR-I | (10) |
| | 17 | BPP-XII | (80) | HDPE-I | (5) | T-IV | (10) | EPR-I | (5) |
| | 18 | BPP-XII | (75) | HDPE-II | (5) | T-IV | (15) | EPR-I | (5) |
| | 19 | BPP-XIII | (80) | HDPE-I | (5) | T-IV | (10) | EPR-I | (5) |
| | 20 | BPP-XIV | (75) | HDPE-I | (5) | T-IV | (15) | EPR-I | (5) |
| | 21 | BPP-XII | (70) | HDPE-I | (10) | T-V | (5) | EPR-I | (5) |
| | 22 | BPP-XIV HPP-II | (40) (35) | HDPE-I | (10) | T-IV | (10) | EPR-I | (5) |
| | 23 | BPP-XII | (75) | HDPE-II | (5) | T-IV | (15) | EPR-II | (5) |
| | 24 | BPP-XII | (70) | HDPE-I | (10) | T-IV | (15) | EPR-I | (5) |
| | 25 | BPP-XII | (57) | HDPE-I | (20) | T-IV | (20) | EPR-I | (3) |
| Comparative Example | 1 | BPP-IX | (90) | | | T-I | (10) | | |
| | 2 | BPP-X | (90) | | | T-I | (10) | | |
| | 3 | BPP-I | (80) | HDPE-III | (10) | T-I | (10) | | |

TABLE 5-continued

| | | (a) | (a') | | (b) | | (c) | |
|---|---|---|---|---|---|---|---|---|
| | 4 | BPP-VI | (80) | HDPE-I | (10) | T-I | (10) | |
| | 5 | BPP-VII | (80) | HDPE-I | (10) | T-I | (10) | |
| | 6 | BPP-VIII | (80) | HDPE-I | (10) | T-I | (10) | |
| | 7 | BPP-I | (80) | HDPE-IV | (10) | T-I | (10) | |
| | 8 | BPP-I | (80) | HDPE-I | (10) | T-II | (10) | |
| | 9 | BPP-I | (80) | HDPE-I | (10) | T-III | (10) | |
| | 10 | BPP-I | (50) | HDPE-I | (10) | T-I | (40) | |
| | 11 | BPP-I | (50) | HDPE-I | (40) | T-I | (10) | |
| | 12 | BPP-I | (90) | HDPE-I | (10) | | | |
| | 13 | BPP-XVII | (75) | | | T-IV | (15) | EPR-I (10) |
| | 14 | BPP-XVIII | (75) | | | T-IV | (15) | EPR-I (10) |
| | 15 | BPP-XII | (55) | HDPE-I | (35) | T-IV | (15) | EPR-I (5) |
| | 16 | BPP-XII | (75) | HDPE-I | (5) | T-VI | (15) | EPR-I (5) |
| | 17 | BPP-XII | (75) | HDPE-I | (5) | T-VII | (15) | EPR-I (5) |
| | 18 | BPP-XII | (75) | HDPE-I | (5) | T-IV | (15) | EPR-III (5) |
| | 19 | BPP-XII | (75) | HDPE-I | (5) | T-IV | (15) | EPR-IV (5) |
| | 20 | BPP-XII | (70) | HDPE-V | (10) | T-IV | (15) | EPR-I (5) |
| | 21 | BPP-XII | (70) | HDPE-VI | (10) | T-IV | (15) | EPR-I (5) |
| | 22 | BPP-XIX | (70) | HDPE-I | (10) | T-IV | (15) | EPR-I (5) |
| | 23 | BPP-XII | (50) | HDPE-I | (10) | T-IV | (35) | EPR-I (5) |

TABLE 6

| | | A | B | C | D | E | F | G | H |
|---|---|---|---|---|---|---|---|---|---|
| Example | 1 | 0.98 | 20200 | 0.88 | 28 | 50 | No | No | 58 |
| | 2 | 0.98 | 20100 | 0.87 | 27 | 51 | No | No | 58 |
| | 3 | 0.98 | 19700 | 0.86 | 26 | 52 | No | No | 59 |
| | 4 | 0.98 | 18700 | 0.86 | 23 | 58 | No | No | 59 |
| | 5 | 1.04 | 22100 | 0.83 | 16 | 57 | No | No | 56 |
| | 6 | 1.04 | 23800 | 0.88 | 20 | 54 | No | No | 54 |
| | 7 | 0.98 | 21500 | 0.88 | 21 | 56 | No | No | 58 |
| | 8 | 1.04 | 21800 | 0.86 | 18 | 51 | No | No | 57 |
| | 9 | 0.98 | 19500 | 0.88 | 26 | 52 | No | No | 59 |
| | 10 | 0.98 | 19700 | 0.89 | 25 | 53 | No | No | 59 |
| | 11 | 0.98 | 18800 | 0.88 | 24 | 56 | No | No | 60 |
| | 12 | | 18900 | 0.87 | 26 | 59 | No | No | 59 |
| | 13 | | 22100 | 0.90 | 28 | 54 | No | No | 58 |
| | 14 | | 20100 | 0.82 | 21 | 56 | No | No | 58 |
| | 15 | | 21800 | 0.85 | 23 | 60 | No | No | 56 |
| | 16 | | 19800 | 0.85 | 20 | 52 | No | No | 55 |
| | 17 | | 19100 | 0.89 | 25 | 62 | No | No | 59 |
| | 18 | | 21600 | 0.89 | 22 | 59 | No | No | 56 |
| | 19 | | 20100 | 0.88 | 24 | 60 | No | No | 57 |
| | 20 | | 19700 | 0.84 | 23 | 61 | No | No | 57 |
| | 21 | | 21100 | 0.81 | 20 | 59 | No | No | 56 |
| | 22 | | 19200 | 0.86 | 22 | 57 | No | No | 58 |
| | 23 | | 21600 | 0.86 | 24 | 60 | No | No | 56 |
| | 24 | | 20300 | 0.83 | 21 | 55 | No | No | 58 |
| | 25 | | 22800 | 0.82 | 17 | 55 | No | No | 55 |
| Comparative Example | 1 | 0.98 | 15100 | 0.87 | 24 | 52 | No | No | 82 |
| | 2 | 0.98 | 17200 | 0.89 | 29 | 50 | No | No | 78 |
| | 3 | 0.98 | 18900 | 0.96 | 24 | 48 | *) | | |
| | 4 | 0.98 | 19000 | 0.92 | 24 | 51 | **) | | |
| | 5 | 0.98 | 16100 | 0.83 | 20 | 59 | No | No | 73 |
| | 6 | 0.98 | 17100 | 0.88 | 25 | 59 | No | No | 68 |
| | 7 | 0.98 | 18900 | 0.95 | 25 | 46 | | | |
| | 8 | 0.98 | 17100 | 0.94 | 20 | 48 | No | No | 67 |
| | 9 | 0.98 | 16200 | 0.89 | 21 | 59 | No | Yes | 85 |
| | 10 | 1.23 | 33800 | 1.00 | 13 | 32 | No | No | 71 |
| | 11 | 0.98 | 15000 | 0.80 | 8 | 62 | No | No | 72 |
| | 12 | 0.90 | 13000 | 0.92 | 27 | 60 | No | No | |
| | 13 | | 17800 | 0.91 | 27 | 53 | No | No | 64 |
| | 14 | | 16200 | 0.90 | 25 | 54 | No | No | 68 |
| | 15 | | 17100 | 0.80 | 12 | 61 | No | Yes | |
| | 16 | | 19000 | 0.86 | 25 | 57 | Yes | No | |
| | 17 | | 18800 | 0.87 | 26 | 58 | Yes | No | |
| | 18 | | 20000 | 0.88 | 27 | 57 | Yes | No | |
| | 19 | | 19900 | 0.87 | 24 | 58 | Yes | No | |
| | 20 | | 20500 | 0.81 | 12 | 52 | No | Yes | 73 |
| | 21 | | 20200 | 0.92 | 22 | 52 | **) | | |
| | 22 | | 20200 | 1.01 | 24 | 53 | **) | | |
| | 23 | | 32600 | 0.92 | 11 | 42 | Yes | Yes | |
| Reference | 1 | | 21300 | 1.5< | 40 | 21 | Yes | No | 67 |
| | 2 | | 21400 | 1.5< | 41 | 19 | **) | | |

*) not moldable due to deficiency in draw-down resistance and deep-drawability
**) not moldable due to deficiency in draw-down resistance

What is claimed is:

1. A polypropylene-based resin composition consisting essentially of as a blend;

(a,a') from 70 to 99 parts by weight of a combination of (a) a homopolymeric polypropylene or a copolymer of from 85% to 98.5% by weight of propylene and from 15% to 1.5% by weight of ethylene, of which the melt index does not exceed 1.0 g/10 minutes and the fraction of the isotactic pentad in the homopolymeric sequences of the propylene moiety is at least 93% and (a') a high-density polyethylene having a melt index not exceeding 0.1 g/10 minutes, of which the parameter A defined by the equation $$A = Z_{50}/Z_{10},$$

in which $Z_{10}$ and $Z_{50}$ are the constant strain rate elongation viscosity at a rate of strain of 0.05 second$^{-1}$ at the moments of 10 seconds and 50 seconds, respectively, at 150° C. has a value in the range from 2 to 20; and (b) from 30 to 1 part by weight of a powder of talc of which the average diameter of the particles does not exceed 5 μm and the average aspect ratio of the particles is in the range from 3 to 20, the total amount of the components (a), (a') and (b) being 100 parts by weight and the amount of the component (a') being 30 parts by weight or smaller.

2. A polypropylene-based resin composition consisting essentially of as a blend:

(a,a') from 55 to 93 parts by weight of a combination of (a) a homopolymeric polypropylene or a copolymer of from 85% to 98.5% by weight of propylene and from 15% to 1.5% by weight of ethylene, of which the melt index does not exceed 1.0 g/10 minutes and the fraction of the isotactic pentad ;n the homopolymeric sequences of the propylene moiety is at least 93% and (a') a high density polyethylene having a melt index not exceeding 0.1 g/10 minutes, of which the parameter A defined by the equation $$A = Z_{50}/Z_{10},$$

in which $Z_{10}$ and $Z_{50}$ are the constant strain rate elongation viscosity at a rate of strain of 0.05 second$^{-1}$ at the moments of 10 seconds and 50 seconds, respectively, at 150° C. has a value in the range from 2 to 20;

b) from 5 to 30 parts by weight of a powder of talc of which the average diameter of the particles does not exceed 5 μm and the average aspect ratio of the particles is in the range from 3 to 20; and (c) from 2 to 15 parts by weight of a rubbery elastomer of which the complex viscosity is in the range from $3 \times 10^4$ to $1 \times 10^6$ poise at a frequency of 0.01 Rad/second, the total amount of the components (a), (a'), (b) and (c) being 100 parts by weight and the amount of the component (a') being 30 parts by weight or smaller.

* * * * *